Patented July 1, 1947

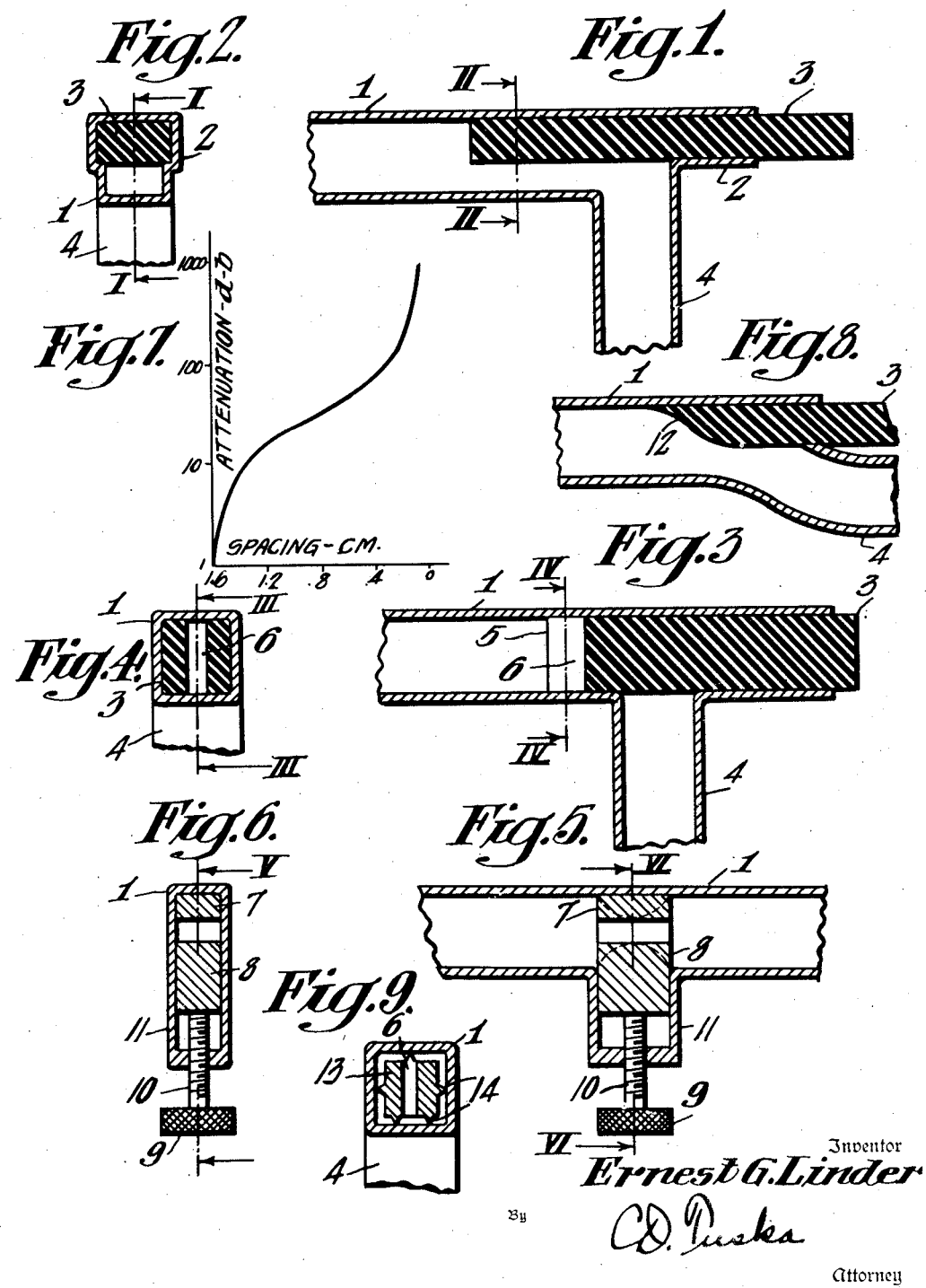

2,423,396

UNITED STATES PATENT OFFICE 2,423,396

WAVE GUIDE ATTENUATOR

Ernest G. Linder, Princeton, N. J., assignor to Radio Corporation of America, a corporation of Delaware Application May 1, 1943, Serial No. 485,356

8 Claims. (Cl. 178—44)

This invention relates generally to the transmission of super-high frequency energy through wave guide transmission circuits, and more particularly to adjustable attenuators inserted in wave guides and operated externally of the guide.

Various attenuators for wave guide systems have been utilized heretofore, but in most instances they have included no entirely satisfactory means for varying the attenuation by external adjusting means which are operable upon the attenuator only.

The instant invention comprises several modifications of externally adjusted wave guide attenuators wherein the effective length of the wave propagation path through the attenuator may be adjusted to control the attenuation thereof. Another modification discloses an attenuator wherein the effective cross-sectional area of the guide may be varied for a predetermined length of the guide.

One of the objects of the invention is to provide an improved method of and means for attenuating super-high frequency waves in a wave guide transmission system. Another object is to provide an improved attenuator for super-high frequency energy in a wave guide wherein the length of the wave path through an energy absorptive material may be adjusted externally of the wave guide. Another object of the invention is to provide an improved attenuator for super-high frequency energy in a wave guide wherein the length of the wave path through energy absorptive material may be adjusted externally of the wave guide, and wherein the wave propagation path within the guide is only partially through the energy absorptive material. Another object is to provide an improved attenuator for super-high frequency energy in a wave guide wherein the attenuator provides minimum reflections of the super-high frequency waves within the guide.

Additional objects of the invention include the provision of an attenuator for super-high frequency waves within a wave guide wherein the effective cross-sectional area of the guide may be externally varied for a predetermined length of the guide. A further object is to provide an externally variable attenuator wherein the propagation path of super-high frequency waves within a wave guide may be varied in length, and wherein the attenuation is provided by losses produced in magnetic material forming the attenuator.

The invention will be further described by reference to the accompanying drawing, of which Figures 1 and 2 are cross-sectional views (taken along the sections I, II) of one embodiment thereof, Figures 3 and 4 are cross-sectional views (taken along the sections III, IV) of a second embodiment thereof, Figures 5 and 6 are cross-sectional views (taken along the sections V, VI) of a third embodiment thereof, Figure 7 is a graph showing the attenuation of a typical filter of the type illustrated in Figs. 5 and 6, Figure 8 is a fragmentary cross-sectional view of a modification of the invention shown in Figs. 1 and 2, and Figure 9 is a fragmentary cross-sectional view of a modification of the invention shown in Figs. 3 and 4. Similar reference numerals are applied to similar elements throughout the drawing.

Referring to Figs. 1 and 2, a wave guide 1 includes a slightly widened portion 2, which forms a guide for an attenuating plug 3, which may be adjusted coaxially within the guide. The attenuator 3 extends outside of the wave guide 1, and may be externally adjusted by any suitable mechanical device, not shown. A second wave guide 4 is connected to the first wave guide 1 adjacent the movable attenuator 3, and is disposed at any predetermined angle with respect to the first wave guide 1. Waves propagated along the wave guides 1 and 4 enter a region adjacent the attenuator 3, wherein the absorptive material of the attenuator dissipates wave energy by an amount dependent upon the length of the attenuator 3 extending into the first wave guide 1. Since this length may be varied by external adjustment, the effective attenuation may be readily controlled. It should be understood that the attenuator 3 may be electrically conductive, in which case longitudinal adjustment thereof in the guide 1 provides a constricted high impedance wave transmission path of adjustable length along the axis of wave propagation.

Figs. 3 and 4 comprise a second modification, wherein the attenuator 3 has cross-sectional dimensions which correspond to the internal cross-sectional dimensions of the first wave guide 1. The face 5 of the attenuator 3, which is presented to the waves propagated within the guides, includes a slot 6 which provides sufficient discontinuity in the attenuator face to reduce materially the reflection of the propagated waves which would normally be produced therefrom.

It will be seen that waves propagated within the wave guides 1 and 4 must pass through a region which is entirely occupied by the attenuating material of the attenuator 3. The length of this region may be adjusted by moving the attenuator 3 axially in the first wave guide 1, by means of any suitable external adjustment.

Figs. 5 and 6 are cross-sectional views of a third modification of the invention, wherein the attenuation is provided by varying the cross-sectional area within the wave guide for a predetermined distance along the axis of wave propagation. Within the guide 1 is a first conductive element 7, which is secured to one of the inner faces of the guide and extends inwardly, for example, a distance of one-third of the guide width. A piston 8, having the same cross-sectional dimensions as the conductive element 7, is arranged to vary the effective width of the guide adjacent the conductive element 7. The opposing faces of the conductive element 7 and of the piston 8 may be parallel, curved, or disposed at some convenient small angle, as shown in dash lines, to reduce wave reflections in the guide. The position of the piston 8 may be adjusted by an external adjusting knob 9, connected thereto by a control shaft 10, which may be threaded into a piston guide 11 attached to the outside surface of the guide 1. The attenuation of this device may be calculated from the following formula:

$$A = \alpha l = \frac{\pi l}{b}\sqrt{1-\left(\frac{2b}{\lambda}\right)^2} \quad (1)$$

wherein $l$ is the effective length of the attenuator along the axis of wave propagation, $\lambda$ equals the wave length of the propagated energy, and $b$ is the average spacing between the conductive element 7 and the piston 8.

Fig. 7 is a graph showing the attenuation in decibels per centimeter with respect to the spacing of the conductive element 7 in the piston 8, for an attenuator having a length of one centimeter for transmitted energy having a wave length of 3.16 centimeters.

Fig. 8 is a fragmentary view of a modification of Fig. 1, wherein the face of the attenuator 3, facing the source of super-high frequency energy, is a curved surface 12, which may, for example, vary the attenuator thickness from maximum to minimum as a function of a sine curve. A curved surface of this type appears to provide minimum reflections of super-high frequency waves caused by discontinuity provided by the attenuator in the wave propagation path.

Fig. 9 is a fragmentary view of a modification of the device disclosed in Figs. 3 and 4, wherein the attenuator 3 is replaced by a magnetic element 13 which occupies only the central portion of the wave guide. The magnetic element 13 may be of compressed comminuted iron particles held together by a suitable binder such as is used in the preparation of high frequency magnetic cores. The magnetic element is supported in the central position within the guide by means of small insulating or conductive supporting spacers 14. The attenuation is provided by the losses produced in the magnetic element 13, and may be varied by adjusting the length of the magnetic element which extends within the wave guide 1.

The attenuators disclosed in Figs. 1, 2, 3, 4 and 8 may be constructed of any materials which provide high absorption and dissipation of super-high frequency energy. For example, conductive rubber having a resistivity of the order of 5 to 200 ohm-centimeters has been found to be extremely satisfactory. Similarly, a rubber substitute, such as neoprene, which includes a suitable proportion of acetylene-black to provide the desired resistivity, may also be employed. Other materials which provide satisfactory attenuation are Bakelite and graphite in suitable proportions, or polystyrene and carbon in suitable proportions.

A typical conductive synthetic rubber composition, having a resistivity of the order of 5 ohm-centimeters, is disclosed and claimed in combination in applicant's copending U. S. application Serial Number 485,357, filed May 1, 1943. The proportions of several attenuator materials are as follows:

*Conductive synthetic rubber composition*

| | Parts |
|---|---|
| Neoprene GN | 100.00 |
| Latac | .50 |
| Extra light cal. mag | 4.00 |
| Shawinigin black | 80.00 |
| Cumar P-25 | 10.00 |
| Neozone D | 2.00 |
| Zinc oxide | 10.00 |
| Total | 206.50 |

Cured 45/290° F.

*Polystyrene-carbon composition*

| | Per cent |
|---|---|
| Polystyrene | 80 |
| Carbon | 20 |

Attenuation of material completely filling wave guide cross-section—4.6 db./cm.

Similarly, an attenuator of orange paper base Bakelite, RCA type PS-51-PB, provides an attenuation of 1.1 db./cm. when the material entirely fills the wave guide cross-section.

A more complete discussion of the attenuation provided in wave guides which are constricted to less than generally accepted critical dimensions is provided in an article by E. G. Linder entitled "Attenuation of electromagnetic fields in pipes smaller than the critical size," published in the Proceedings of I. R. E., December 1942, pages 554–556.

Thus the invention described comprises several modifications of super-high frequency attenuators for wave guides, wherein the effective attenuation may be varied by externally adjusting the position of the attenuator within the wave guide.

I claim as my invention:

1. A dielectric guide attenuator for super-high frequency energy including a first wave guide having an opening therein at the end remote from the source of said energy, a plug of energy absorptive material disposed within said first wave guide displacing transversely the normal dielectric of said guide and extending outside of said guide through said opening, a second wave guide disposed in operable relation normally with respect to said first wave guide adjacent to said plug, and means for adjusting the degree of penetration of said plug into said first wave guide for varying the effective attenuating length of said plug along the axis of wave propagation in said guide.

2. A dielectric guide attenuator for super-high frequency energy including a first wave guide having an opening therein at the end remote from the source of said energy, a plug of energy absorptive material disposed within said first wave guide displacing transversely a portion of the normal dielectric of said guide and extending outside of said guide through said opening, a second wave guide disposed in operable relation at an angle with respect to said first wave guide adjacent to said plug, and means for adjusting the degree of penetration of said plug into said first wave guide for adjusting the effective attenuating length of said plug along the axis of wave propagation in said guide.

3. A dielectric guide attenuator for super-high frequency energy including a first wave guide having an opening therein at the end remote from the source of said energy, a conductive plug disposed within said first wave guide displacing transversely a portion of the normal dielectric of said guide and extending outside of said guide through said opening, a second wave guide disposed in operable relation at an angle with respect to said first wave guide adjacent to said plug, and means for adjusting the degree of penetration of said plug into said first wave guide for adjusting the effective attenuating length of said plug along the axis of wave propagation in said guide.

4. Apparatus according to claim 3 wherein said energy absorptive plug consists of comminuted iron and insulating material in predetermined proportions.

5. A dielectric guide attenuator for super-high frequency energy including a first wave guide having an opening therein at the end remote from the source of said energy, a plug of energy absorptive material disposed within said first wave guide displacing transversely the normal dielectric of said guide and extending outside of said guide through said opening, a second wave guide disposed in operable relation at an angle with respect to said first wave guide adjacent to said plug, and means for adjusting the degree of penetration of said plug into said first wave guide for varying the effective attenuating length of said plug along the axis of wave propagation in said guide.

6. Apparatus according to claim 5 wherein said plug may be selectively adjusted to a position covering the junction of said wave guides.

7. Apparatus of the type described in claim 5 wherein said attenuator plug is tapered toward its energy input end to provide impedance matching between said guide and said attenuator.

8. Apparatus of the type described in claim 5 wherein the energy input face of said attenuator plug is shaped to minimize energy reflections in said guide.

ERNEST G. LINDER.

REFERENCES CITED

The following references are of record in the file of this patent:

UNITED STATES PATENTS

| Number | Name | Date |
|---|---|---|
| 2,197,123 | King | Apr. 16, 1940 |
| 2,206,683 | Wolff | July 2, 1940 |
| 2,228,798 | Wassermann | Jan. 14, 1941 |
| 2,165,738 | Van Hoffen | July 11, 1939 |
| 2,197,122 | Bowen | Apr. 16, 1940 |